United States Patent

[11] 3,547,232

| [72] | Inventor | Donald J. Fergle<br>St. Clair Shores, Mich. |
|---|---|---|
| [21] | Appl. No. | 743,857 |
| [22] | Filed | July 10, 1968 |
| [45] | Patented | Dec. 15, 1970 |
| [73] | Assignee | Eaton Yale & Towne Inc.<br>Cleveland, Ohio<br>a corporation of Ohio |

[54] EXPLOSIVE ACTUATED BRAKE
8 Claims, 6 Drawing Figs.

[52] U.S. Cl. ................................................. 188/110,
188/189; 192/.033; 303/49
[51] Int. Cl. ....................................................... B06t 7/12
[50] Field of Search ........................................... 303/21, 28,
49; 188/110, 185, 189; 192/.033, 1

[56] References Cited
UNITED STATES PATENTS
1,659,690   2/1928   Kemble ....................... 303/21

2,257,610   9/1941   Kraft ............................ 188/110UX
2,922,498   1/1960   Fleenor ........................ 303/49UX

*Primary Examiner*—Duane A. Reger
*Attorney*—Woodhams, Blanchard and Flynn

ABSTRACT: A brake apparatus for applying a load to movable, usually rotatable, means, such as a shaft, drum or wheel, utilizing a radially flexible friction member affixed to either a frame or to the movable means and frictionally engageable with the other thereof. Chamber means are connected in association with the radially flexible friction member for causing the friction member to move radially into such frictional engagement upon an application of gas to the chamber. A quantity of gas-generating combustible material is connected in gas communication with the chamber means. Means are provided for firing the material so that the chamber means will fill with gas under pressure to cause the radially flexible friction member to move radially into engagement with either the frame means or the movable means to apply a load to movable means.

PATENTED DEC 15 1970

3,547,232

INVENTOR.
DONALD J. FERGLE
BY
Woodhams, Blanchard & Flynn
ATTORNEYS

EXPLOSIVE ACTUATED BRAKE

FIELD OF THE INVENTION

This invention relates to protective brake apparatus and, more particularly, relates to an overspeed protection device for a moving part such as a rotative shaft. In particular, the invention applies to an emergency load to the power shaft of a free turbine engine to prevent same from running away under such circumstances as when the load is removed therefrom too quickly for the fuel control to respond appropriately or when the normal load or brake applying means becomes accidentally inoperative.

BACKGROUND OF THE INVENTION

This invention was developed as an overspeed protection device for a free turbine-type gas turbine engine to prevent the free turbine from running away in the event the load has been removed therefrom more rapidly than fuel control can respond. However, it is to be recognized that the brake apparatus can be applicable in many other and varied applications, such as an emergency mechanism which is to be employed to actuate or set the brakes of a vehicle in the event of a failure of the normal mechanism provided for this purpose.

Particularly, it sometimes occurs that in the application of a free turbine engine to automotive use, the engine will be connected to the ground wheels through a transmission consisting of spur gears. Such use of transmissions having spur gears is recognized as advantageous from the standpoint of efficiency and economy in the transmission of power from the engine to the ground wheels but raises problems from the standpoint of maintaining a load at all times on the engine during a ratio shifting operation. Since the free turbine of a free turbine engine can accelerate in only a fraction of a second, to destructive speeds if the load is removed therefrom, and since for well-understood reasons the fuel control method of controlling engine speeds (such as used for reciprocating engines) may not be entirely satisfactory or is too expensive in connection with turbine engines, a variety of techniques have been employed to prevent the turbine engine from overspeeding during the shifting operation of a spur gear type of transmission. While these means are in general satisfactory, it has nevertheless been recognized that such means involving mechanical devices may sometimes fail, or at least not operate to full effectiveness, and in such case the turbine will still overspeed to destruction. It has therefore been desirable to provide in connection with such a turbine and transmission arrangement a positively acting, simple and inexpensive, but reliable, emergency device which will be effective to prevent overspeeding and consequent destruction of such a turbine if and when the load is removed therefrom more quickly than the fuel supply can, or does, respond thereto.

It has further long been recognized that similarly efficient and reliable arresting means should be made available for the braking system of vehicles for automatic application in the event of the failure of the normal braking system provided for same or in the event of sudden disability on the part of the operator. It is accordingly of particular importance that such a system be responsive to the speed of the vehicle rather than to manipulation by the operator, although in some instances it is further desirable to have an auxiliary or secondary means provided in addition to such automatic means by which the auxiliary braking means may be actuated by the operator, if desired.

A further problem in connection with apparatus of this type arises from the fact that same is inoperative over a long period of time, often years, but it is necessary that it operate immediately and reliably when the need arises. It is therefore desirable to have such a device capable of presenting to the operator of the vehicle a constant indication concerning the state of readiness of such emergency mechanism. Particularly, in connection with electrically triggered apparatus, it is desirable to enable the operator to be constantly informed whether or not the device is generating the proper electrical potential and maintaining same available for use to energize the emergency apparatus if and when same is needed.

Accordingly, the objects of this invention include:

1. To provide an emergency braking means for a shaft which means are completely self-contained and which may readily be either manually operated if desired or rendered automatically operable upon the attainment by said shaft of a predetermined speed.
2. To provide a device, as aforesaid, which will function effectively as a turbine engine overspeed protection device which is automatically actuated when the free turbine speed reaches a predesignated magnitude.
3. To provide an emergency operating mechanism for vehicle brakes which may be readily and conveniently energized by the operator of the vehicle upon failure of the usual brake actuating system.
4. To provide an emergency brake-actuating mechanism for vehicles which may be electrically energized at the will of the operator of a vehicle to set the brakes upon failure of the usual brake actuating mechanism.
5. To provide an emergency brake actuating mechanism for vehicles which may be automatically energized upon the attainment by said vehicle of a predetermined speed.
6. To provide an emergency brake actuating mechanism for vehicles which will be simple and inexpensive but which will be completely self-contained and which can be carried inactive for a long period of time without seriously diminishing the probability of its successful operation if and when needed.
7. To provide a device, as aforesaid, which will be applicable for a wide variety of other uses wherein a self-contained, efficient and simple but reliable device is needed for either the automatic or manual application of braking force to a shaft by means which can remain inactive over a long period of time but will be instantly available for effective operation when needed.
8. To provide a shaft overspeed protection device wherein an indicator mechanism is placed in the cab of a vehicle so that the operator can determine whether the mechanism for energizing the protection device is functioning properly.

Other objects and purposes of this invention will be apparent to persons acquainted with apparatus of this general type upon reading the following specification and inspecting the accompanying drawing, in which.

Figure 5:
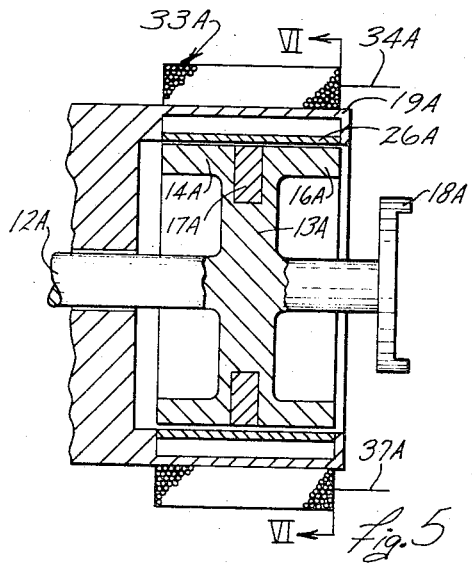
FIG. 5 is a central longitudinal sectional view of a modified brake apparatus.

Certain terminology will be used in the following description for convenience in reference only and will not be limiting. The words "up", "down", "right" and "left" will designate directions in the drawing to which reference is made. The words "in" and "out" will refer to directions toward and away from, respectively, the geometric center of the device and designated parts thereof. Said terminology will include the words above specifically mentioned, derivatives thereof, and words of similar import.

SUMMARY OF THE INVENTION

The objects and purposes of the invention are met by providing a brake apparatus for applying a load to movable, usually rotatable, means. Said apparatus utilizes a radially flexible friction member which is connected in association with chamber means for causing the friction member to move radially to apply such load upon an application of gas to the chamber means. A quantity of gas-generating combustible material is provided and is connected in gas communication with the chamber means so that when the material is fired, the chamber means will fill with gas to cause the radially flexible friction member to move radially to couple a load to the movable means.

DETAILED DESCRIPTION

Figure 1:
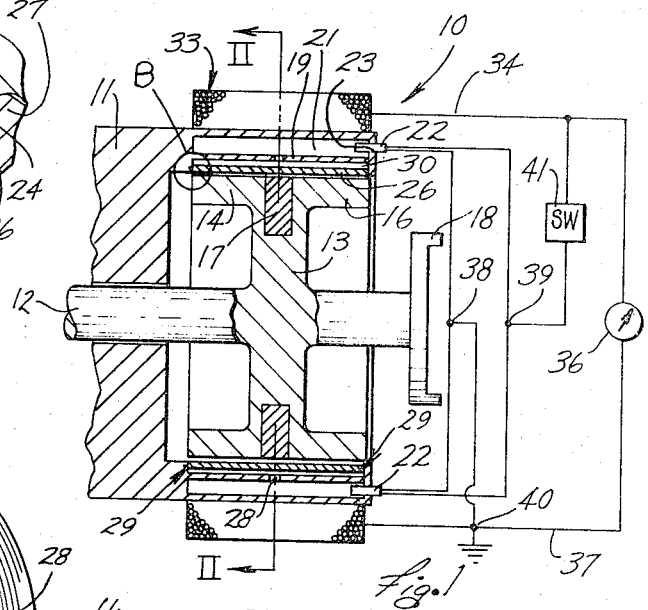
FIG. 1 is a central longitudinal sectional view of a brake apparatus embodying the invention.
Figure 2:
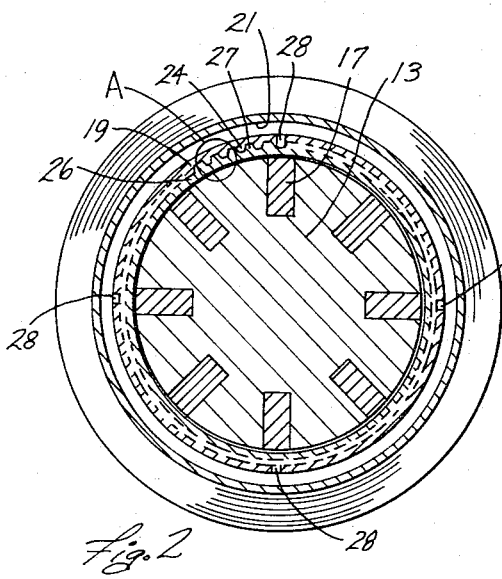
FIG. 2 is a sectional view taken along the line II–II of FIG. 1.

Referring first to FIG. 1, the brake mechanism 10 comprises a frame 11 which overlaps the movable means which under some circumstances may be a reciprocable rod but will for illustrative purposes hereinafter be assumed to be a rotatable device, such as a drum wheel or shaft here the shaft 12. The shaft 12 can be the shaft which it is desired to control, such as the output shaft of a free turbine-type gas turbine engine or the drive shaft to the vehicle wheels. The power shaft 12 can also be a shaft positively connected, such as by suitable gearing, to the shaft which it is desired to control. However, for the purposes of discussion, the shaft 12 will be assumed to be the output shaft of the gas turbine engine.

The shaft 12 has a hub 13 extending radially outwardly therefrom, said hub having annular flanges 14 and 16 extending axially leftwardly and rightwardly, respectively, from the radially outermost end of the hub 13.

In this particular embodiment, a plurality of permanent magnets 17 are positioned centrally of the hub 13 and flanges 14 and 16 adjacent the outer periphery thereof. A shaft coupling 18 is secured to the right end of the shaft 12 for purposes of engaging the remainder of the drive train of a Vehicle.

The frame 11 comprises an annular sleeve portion 19 which overlaps the flanges 14 and 16 and includes an annular hollow portion defining an annular chamber 21. A plurality of gas-generating combustible material cartridges 22 extend through openings 23 in the annular sleeve portion 19 into the annular chamber 21. Openings 28 are provided in the chamber 21 in the radially inner surface of the sleeve portion 19.

Figure 3:
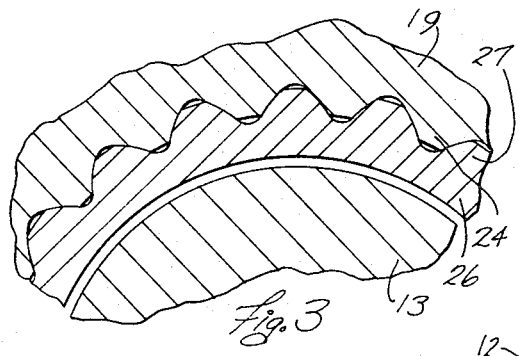
FIG. 3 is an enlarged showing of the encircled portion of FIG. 2 labeled "A".
Figure 4:
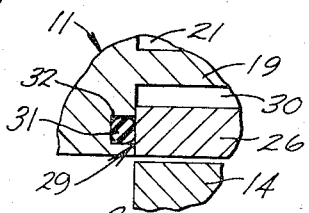
FIG. 4 is an enlarged showing of the encircled portion of FIG. 1 labeled "B".

The radially inner surface of the sleeve portion 19 is splined as at 24 (FIG. 3). A radially flexible friction member 26 having external splines 27 corresponding to the splines 24 is interengaged with the splines 24 so that the friction member is prevented from relative rotation with respect thereto. The axially spaced edge portions of the friction member 26 engage sealing devices 29 (FIG. 4) such as an O-ring 31 in an O-ring groove 32. Thus, the radially flexible friction member 26 is permitted to move radially uniformly over the full width of the friction member for uniform engagement with the outer surface of the flanges 14 and 16. The spacing between the sleeve portion 19 and the sleeve 26 defines a chamber 30 (FIG. 4). The openings 28 in the sleeve portion 19 interconnects the chamber 30 with the chamber 21.

An electrical coil 33 is fixed to the frame 11 and encircles the chamber 21, the hub 13 and flanges 14 and 16. The spacing between the outer periphery of the flanges 14 and 16 and the inner surface of the coil 33 must be minimized as much as possible so that the magnetic field of the moving permanent magnets 17 will induce a voltage into the coil 33.

In this particular embodiment, the output of the coil 33 is connected through a conductor 34 to one side of a meter 36. The other side of the meter is connected through a conductor 37 to ground terminal 40 and to the input of the coil 33. The ground terminal 40 provides a reference potential so that spurious voltages will not be permitted to build up to accidently fire the cartridges 22. The meter is preferably located in the cab of a vehicle (not shown) so that the operator can determine if the permanent magnets 17 are generating a potential across the input and output terminals to the coil 33. If the operator notes that no potential is being generated, he is then made aware of the fact that there is no potential for energizing the cartridges 22 in the event of an emergency.

The cartridges 22, in this particular embodiment, are connected electrically in parallel with each other so that one side thereof is connected to a ground terminal 38 and the other side is connected to a terminal 39. A switching device 41 is connected between the terminal 39 and the conductor 34. The switching device 41 can be manually operated or automatically operated or both depending upon the desired use of the brake apparatus 10. If, for example, it is assumed that the switching device 41 is a normally open single pole, single throw switch, a closing of said switch would apply the potential on the conductor 34 to the cartridges 22, which potential would be sufficient to activate the cartridges causing them to explode and fill the annular chamber 21 with gas.

If, on the other hand, it is desired to have the brake apparatus 10 automatically actuated, a normally open switch which is sensitive to changes in potential, such as a Zener diode, can be utilized so that if the shaft 12 undergoes a substantial increase in speed, which would indicate that the load has been removed therefrom, the permanent magnet 17 would generate an instantaneous higher potential across the input and output to the coil 33 so that the potential sensing switch would conduct to activate the cartridges 22 causing same to explode and fill the chamber 21 with gas.

OPERATION

The operation of the device embodying the invention will be described in detail hereinbelow for a better understanding of the invention.

When the switching device 41 is closed, the gas generating combustible material cartridges will be energized causing same to burn to fill the annular chamber 21 with gas under a substantial pressure. This gas will be conducted through the openings 28, fill the chamber 30 (FIG. 4) and cause the friction member 26 to contract into engagement with the outer periphery of the flanges 14 and 16. Since the spaced edge portions of the friction member 26 slideably engage the sealing devices 29, the friction member 26 is permitted to contract uniformly over the full width thereof so that a uniform engagement thereof with the outer periphery of the flanges 14 and 16 is made possible. Furthermore, since the friction member 26 is splined to the annular portion 19 of the frame 11 and is stationary, a frictional load is applied to the flanges 14 and 16 which results in a load being applied to the shaft 12 to brake or stop the shaft 12 as desired.

Figure 6:
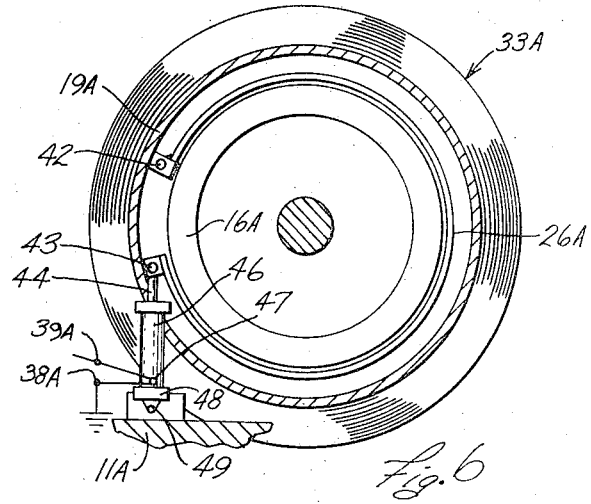
FIG. 6 is a sectional view taken along the line VI–VI of FIG. 5.

MODIFIED CONSTRUCTION OF FIGS. 5 and 6

The brake apparatus 10A is closely similar to the brake apparatus 10 illustrated in FIG. 1. Therefore, for purposes of discussion, the component parts of the brake apparatus 10A will be referred to by the same reference numerals designating corresponding parts of the brake apparatus 10 but with the suffix "A" added thereto.

In this particular embodiment, the sleeve portion 19A encircles the flanges 14A and 16A on the hub 13A. The permanent magnets 17A are spaced as close as possible to the electrical coil 33A so that the magnetic field of the moving magnets 17A will generate a potential in the coil 33A in a manner like that discussed in FIG. 1. One end of the strip of flexible friction material 26A is secured as at 42 to the inner surface of the portion 19A of the frame 11A. The friction member 26A encompasses the flanges 14A and 16A over a majority of the outer periphery thereof but is spaced radially outwardly therefrom. The other end of the friction material 26A is secured as at 43 to a rod 44 which is movably by pressure generated in a cylinder 46. In this particular embodiment the cylinder 46 is energized by a cartridge of gas-generating combustible material 47.

The electrical circuit for the modified embodiment of FIGS. 5 and 6 is identical to the circuit illustrated in FIG. 1 and therefore needs no further detailing. The cartridge 47 is connected between the terminals 38 and 39 in the electrical circuit illustrated in FIG. 1. The end 48 of the cylinder 46 is secured as at 49 to the frame 11A.

In operation, when the normally open switching device 41 is closed, a potential will be applied across the terminals 38 and 39 to energize the cartridge 47 causing it to burn and filling the cylinder 46 with gas under pressure to cause the piston rod 44 to move outwardly therefrom. This movement will cause the flexible friction member 26A to move into engagement with the outer periphery of the flanges 14A and 16A to thereby apply a load thereto. This load will be sufficient to prevent, for example, the free turbine of a gas turbine engine from running away as well as being sufficient to apply a load to the drive shaft or any equivalent part of a vehicle for braking same in an emergency.

While the foregoing discussion has assumed a radially flexible friction member capable of contracting into engagement with the outer periphery of the flanges 14, 14A and 16, 16A, it is recognized that the same principle could be utilized wherein the friction member is expansible or, within the broader concepts of the invention, wherein there are used other types of braking devices responsive to the axial movement of the rod 44.

I claim:

1. In engagement apparatus for applying a load to an elongated member which is movable with respect to a frame means, the combination comprising:

radially flexible friction member affixed to one of said frame means and said elongated member;

first chamber means connected in association with said radially flexible friction member for causing said friction member to move radially upon an application of gas to said chamber means;

second chamber means for containing a quantity of gas-generating combustible material, said second chamber means being mounted at least partially within said first chamber means so that when the gas-generating combustible material is fired, the gas produced will be directly connected in gas communication with said first chamber means;

means for firing said material whereby said first chamber means will instantly fill with gas under pressure to immediately cause said radially flexible friction member to move radially into engagement with one of said frame means and said elongated member to apply a load to said elongated member.

2. The device defined in claim 1 wherein said elongated member is a rotatable shaft.

3. The device defined in claim 2, wherein said elongated member has drum means affixed thereto and rotatable therewith; and wherein said frame means encircles said drum means and has said radially flexible friction member fixed against relative rotation with respect thereto; and wherein said first chamber means surrounds said drum means in said frame means, said radially flexible friction member being positioned between said first chamber means and said drum means, said first chamber means being in gas communication with the radially outer surface of said friction member whereby a firing of said material will fill said first chamber means with gas to move said friction member radially inwardly into engagement with said drum means to apply a load to said shaft.

4. The device defined in claim 1, wherein electrical means responsive to an excessive speed of said elongated member are provided for firing said material.

5. A turbine overspeed protection mechanism for a free turbine engine having a free power turbine and an output shaft connection to said free power turbine, comprising in combination;

breaking means associated with said free power turbine and explosive charge receiving chamber means connected for actuating said braking means upon an application of gas thereto;

explosive charge means responsive to the speed of rotation of said free power turbine and connected to actuate said braking means;

means energizing said explosive charge means in response to a predetermined speed of rotation of said power turbine, whereby said explosive charge means will produce a gas in said explosive charge receiving chamber means to actuate said braking means to prevent free power turbine overspeed.

6. In a brake apparatus for applying a load to a rotatable shaft, the combination comprising:

frame means;

radially flexible friction member affixed to one of said frame means and said shaft;

chamber means connected in association with said radially flexible friction member for causing said friction member to move radially upon an application of gas to said chamber means;

gas-generating means mounted at least partially within said chamber means so that when said gas-generating means is fired, the gas produced will be directly connected in gas communication with said chamber means; and means for firing said gas-generating means whereby said chamber means will immediately fill with gas to cause said radially flexible friction member to move radially into engagement with one of said frame means and said shaft to apply a load to said shaft.

7. A turbine overspeed protection mechanism for a free turbine gas turbine engine having a free power turbine and an output shaft connection to said free power turbine, comprising in combination;

braking means associated with said free power turbine and explosive charge receiving chamber means connected for actuating said braking means upon an application of gas thereto;

explosive charge means responsive to the speed of rotation of said free power turbine and mounted at least partially within said explosive charge receiving chamber means and producing a gas when energized; and means energizing said explosive charge means in response to a predetermined speed of rotation of said power turbine, whereby said explosive charge means will produce a gas in said explosive charge receiving chamber means to actuate said braking means to prevent free power turbine overspeed.

8. A brake apparatus for applying a load to an elongated member, the combination comprising:

frame means having a chamber therein;

a partition in said chamber dividing said chamber into two subchambers, a plurality of openings in said partition providing gas communication between said two subchambers;

a continuous, annular, radially flexible brake shoe mounted in one of said subchambers for radial movement;

means for securing said brake shoe to said partition for preventing relative circumferential movement, while at the same time permitting relative radial movement therebetween;

sealing means sealingly and slidingly engaging the axially facing edge portions of said brake shoe;

gas-generating explosive charge means connected in gas communication with the other of said subchambers so that when said gas-generating means is fired, the gas produced will enter said other subchamber; and means energizing said gas-generating explosive charge means whereby said subchambers will fill with gas under pressure to cause said brake shoe to move radially into engagement with said elongated member.